(12) United States Patent
Chappellet

(10) Patent No.: US 11,959,005 B2
(45) Date of Patent: Apr. 16, 2024

(54) LIQUID CRYSTAL COMPOUNDS

(71) Applicant: ROLIC TECHNOLOGIES AG, Allschwil (CH)

(72) Inventor: Sabrina Chappellet, Village-Neuf (FR)

(73) Assignee: ROLIC TECHNOLOGIES AG, Allschwil (CH)

( * ) Notice: Subject to any disclaimer, the term of this patent is extended or adjusted under 35 U.S.C. 154(b) by 182 days.

(21) Appl. No.: 17/434,947

(22) PCT Filed: Mar. 16, 2020

(86) PCT No.: PCT/EP2020/057092
§ 371 (c)(1),
(2) Date: Aug. 30, 2021

(87) PCT Pub. No.: WO2020/207709
PCT Pub. Date: Oct. 15, 2020

(65) Prior Publication Data
US 2022/0127531 A1    Apr. 28, 2022

(30) Foreign Application Priority Data
Apr. 8, 2019 (EP) .................................. 19167783

(51) Int. Cl.
*G02F 1/1333* (2006.01)
*C09K 19/04* (2006.01)

(52) U.S. Cl.
CPC ...... *C09K 19/04* (2013.01); *C09K 2019/0448* (2013.01)

(58) Field of Classification Search
CPC ...... C09K 19/04; C09K 19/322; C09K 19/38; C09K 19/3804; C09K 2019/0448; G02F 1/1333
See application file for complete search history.

(56) References Cited

U.S. PATENT DOCUMENTS

| | | | |
|---|---|---|---|
| 5,593,617 A | 1/1997 | Kelly et al. | |
| 5,650,534 A | 7/1997 | Kelly et al. | |
| 5,707,544 A | 1/1998 | Kelly | |
| 5,798,147 A | 8/1998 | Beck et al. | |
| 6,733,690 B1 * | 5/2004 | Lukac ............. | C09K 19/38 252/299.61 |
| 7,670,505 B2 | 3/2010 | Enger et al. | |
| 9,222,024 B2 * | 12/2015 | Brill ............. | B44F 1/10 |
| 2008/0221289 A1 | 9/2008 | Enger et al. | |
| 2010/0059709 A1 | 3/2010 | Bachels et al. | |
| 2022/0127531 A1 * | 4/2022 | Chappellet ......... | C09K 19/04 |

FOREIGN PATENT DOCUMENTS

| | | |
|---|---|---|
| EP | 1 090 325 B | 4/2001 |
| EP | 3 187 566 A1 | 7/2017 |
| JP | 8-73409 A | 3/1996 |
| WO | 00/55110 A1 | 9/2000 |
| WO | 2011/003846 A1 | 1/2011 |
| WO | 2012/085048 A1 | 6/2012 |

OTHER PUBLICATIONS

International Search Report of PCT/EP2020/057092 dated May 25, 2020 [PCT/ISA/210].
Written Opinion of PCT/EP2020/057092 dated May 25, 2020 [PCT/ISA/237].
Berget et al., "Catalysis by titanocene-functionalized polymer-supported dendrimers", Tetrahedron Letters, 2007, vol. 48, pp. 8101-8103 (3 pages total).

* cited by examiner

*Primary Examiner* — Geraldina Visconti
(74) *Attorney, Agent, or Firm* — Sughrue Mion, PLLC

(57) ABSTRACT

The invention relates to novel polymerizable liquid crystals of formula (I), to LCP mixtures comprising these compounds and to their uses for optical and electro-optical devices:

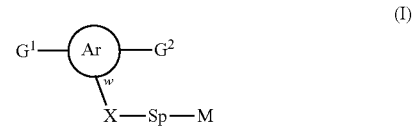

(I)

with the proviso the at least one of the polymerisable groups $G^1$ or $G^2$ is a naphthalenediyl group.

12 Claims, No Drawings

LIQUID CRYSTAL COMPOUNDS

CROSS REFERENCE TO RELATED APPLICATIONS

This application is a National Stage of International Application No. PCT/EP2020/057092 filed on Mar. 16, 2020, claiming priority based on European Patent Application No. 19167783.0 filed on Apr. 8, 2019.

The present invention relates to laterally substituted curable Liquid Crystals (LCPs) having mesogenic properties or properties which cause these LCPs to be compatible with a mesogenic molecular structure. In particular the present invention relates to laterally substituted curable Liquid Crystals (LCPs) with adjustable optical anisotropy and in parallel with low melting point or good supercoolability, relatively high clearing point and good alignment properties and the use of such LCPs in the preparation of substantially uniform or patterned film in which the orientation of the LCP molecules in the plane and relative to the plane of the substrate can be controlled.

Films prepared from curable Liquid Crystals (LCP films) are well known to a skilled person and are used in the preparation of optical and electro-optical devices. U.S. Pat. No. 5,650,534 discloses compounds and mixtures used to prepare components suitable for use non-linear optical (NLO) applications. These compounds are optically active and exhibit chiral smectic or chiral nematic mesophases. U.S. Pat. No. 5,707,544 also discloses compounds and mixtures suitable for use in NLO applications. However, these compounds are characterised by relatively high melting points. U.S. Pat. No. 5,593,617 discloses photochemically polymerisable liquid crystal compounds and mixtures, which are used to prepare optical and electronic components. However, these mixtures have a relatively narrow operating range and are unsuitable for use at higher temperatures.

LCP films are generally manufactured by using known coating and printing techniques. This involves coating an organic solution of a cross-linkable LCP or LCP mixture onto a substrate provided with an orientation layer. The organic solvent is subsequently removed to give a well-oriented, solvent-free mesogenic LCP layer, which in turn is cross-linked to fix the liquid crystalline properties ordered structure. The desired optical performance of such films depends crucially on some physical parameters which the LCP material has to fulfil simultaneously. Such properties are a nematic mesophase, a high clearing point, a low melting point or a low tendency to crystallise when cooled below melting point (supercooling), good solubility in organic solvents, good miscibility with other LCPs, good aligning properties on orientation layers, and the ability to form an adjustable tilt out of the substrate plane essentially free of tilt domains and disclinations. Tilt domains are regions within the LCP film in which the long axes of the LCP molecules form tilt angles out of the plane of the substrate of the same size but in opposite direction. Disclinations are borderlines of neighbouring tilt domains where LCP molecules of opposite tilt angles are adjacent. These tilt domains and disclinations result in both a disturbance in the uniform appearance of the film and an inhomogeneous optical performance.

Retardation films are a type of optical elements which change the polarization state of light passing through the same. When light passes through a phase retarder its polarization direction changes because of the birefringence and the thickness of the phase retarder. One of the biggest issues in preparation of phase retarders is to prepare high performing films at a small charge. When liquid crystals having high birefringence are used, it is possible to realize the necessary retardation value with small quantities of liquid crystals compounds.

For adjusting the optical properties of the layers and films prepared from LCPs as for example retardation films, it is further essential to have available a variety of LCP materials with differing optical anisotropy, mainly high optical anisotropy. It is known that LCPs exhibiting a high optical anisotropy often show a negative impact on several of the above properties. Particularly the formation of smectic mesophases, high melting points, an enhanced tendency to crystallise, a low solubility in organic solvents or reduced miscibility with other LCPs is observed. Furthermore the ability of homogeneous alignment free of tilt domains and disclinations is often reduced.

There is, therefore, a need for a new LCP material that may be used in the preparation of an LCP mixture, which significantly reduces the aforementioned disadvantages. The present invention addresses that need.

A first aspect of the invention provides a compound of formula (I)

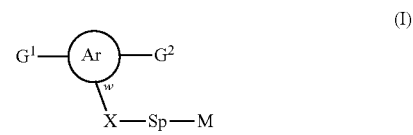

(I)

wherein $G^1$ and $G^2$ independently represent a polymerisable mesogenic residue;

Ar represents an aromatic group selected from the group consisting of phenyl or naphthalenediyl;

w is 1 or 2;

X represents a group selected from the group consisting of —$CH_2$—, —O—, —CO—, —COO—, —OOC—, —CONR'—, —OCOO— and —OCONR';

Sp represents a group of the formula —($CH_2$)p- in which p is an integer of 1 to 18 and in which one or two non-adjacent —$CH_2$— groups are optionally replaced by —CH=CH—; or in which one or two —$CH_2$— groups are optionally replaced by one or two groups selected from the group consisting of —O—, —CO—, —COO—, —OOC—, —CONR'—, —OCOO—, —OCONR' with the proviso that firstly the spacer group does not contain two adjacent heteroatoms and secondly when X is —$CH_2$—, p can also have a value of 0; and M represents an achiral group of formula (II)

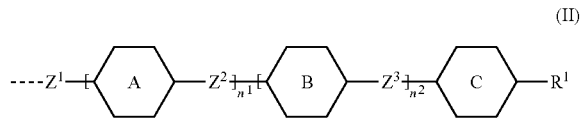

(II)

in which

A and B independently represent an optionally substituted six membered isocyclic or heterocyclic group or naphthalenediyl;

C is selected from the group consisting of a five and six membered isocyclic or heterocyclic group or naphthalenediyl;

$n^1$ and $n^2$ are 0 or 1 with the proviso that firstly $1 \leq n^1+n^2 \leq 2$ and secondly, when C is naphthalenediyl $0 \leq n^1+n^2 \leq 2$;

$Z^1$ is selected from the group consisting of —O—, —COO—, —OOC—, —CO—, —CONR'—, —NR'CO—, OCOO—, —OCONR'—, —NR'COO— and a single bond;

in which

R' is selected from the group consisting of hydrogen, a lower achiral alkyl group and a lower achiral alkenyl group;

$Z^2$ and $Z^3$ are independently selected from the group consisting of single bond, —COO—, —OOC—, —CH$_2$—CH$_2$—, —CH$_2$O—, —OCH$_2$—, —CH=CH—, —C≡C—, —(CH$_2$)$_4$— and —(CH$_2$)$_3$O—; and $R^1$ is selected from the group consisting of
H, —CN, —COR, —COOR, —OCOR, —CONR'R, —NR'COR,
OCOOR, —OCONR'R, —NR'COOR, —F, —Cl, —CF$_3$, —OCF$_3$, —OR and —R
in which
R is selected from the group consisting of hydrogen, an achiral C$_{1-18}$ alkyl group and an achiral C$_{4-18}$ alkenyl group with the double bond at 3-position or higher; and
R' is as defined above.

In addition to the laterally substituted mesogenic compounds referred to above, such compounds are also disclosed in WO 00/55110. However, many of these compounds are not suitable for preparing LCP films for use in optical films. It has been found that by using the compounds of the present invention it is possible to prepare thinner phase retarder compared to those of the prior art. Furthermore, the LCPs according to the present invention generally exhibit good alignment properties and show a decreased tendency to form tilt domains and disclinations. Furthermore, the compounds of the invention have a comparatively good solubility in organic solvents and a high miscibility with other LCP compounds. Furthermore, the compounds of the present invention show a higher birefringence and hence less material is needed in optical structures.

The optical anisotropy of the compounds of the invention may be easily adapted to requirements only by selecting different groups of M of formula I without changing the main core of the molecule. This allows an economical access to a broad range of LCPs exhibiting different optical anisotropies with a minimum of chemical steps in their production.

The polymerisable mesogenic residues G$^1$ and G$^2$ may be the same or different.

The group X is preferably selected from the group consisting of —CH$_2$—, —O—, —COO—, —OOC— and —OCOO—.

The spacer group Sp may be optionally substituted by one or more fluorine or chlorine atoms. Groups in which there are no substituent groups present are preferred. It is especially preferred that the integer p has a value of from 1 to 12 and that no more than two —CH$_2$— groups are replaced by —O— and that no more than one —CH$_2$— group is replaced by one group selected from the group consisting of —CH=CH—, —CO—, —COO—, —OOC—, —CONR'—, —OCOO— and —OCONR'.

The groups A and B are saturated, unsaturated or aromatic. They are optionally substituted by one or two substituents selected from the group consisting of F, Cl, CN, a lower alkyl, lower alkenyl, lower alkoxy and lower alkenyloxy. Preferably the groups A and B each contain no more that one substituent. It is especially preferred that the groups A and B contain no substitution.

It is preferred that the groups A and B are selected from the group consisting of 1,4-phenylene, pyridine-2,5-diyl, pyrimidine-2,5-diyl, trans-1,4-cyclohexylene or trans-1,3-dioxane-2,5-diyl, 1,4-naphthalenediyl and 2,6-naphthalenediyl. Is it especially preferred that A and B are selected from the group consisting of 1,4-phenylene, trans-1,4-cyclohexylene and 2,6-naphthalenediyl.

The group C is saturated, unsaturated or aromatic. It is optionally substituted with one or two substituents selected from the group consisting of F, Cl, CN, a lower alkyl, lower alkenyl, lower alkoxy and lower alkenyloxy. It is preferred that the group C contains at most one substituent. It is especially preferred that the group C contains no substitution.

It is preferred that the group C is selected from furan-2,4-diyl, furan-2,5-diyl, tetrahydrofuran-2,4-diyl, tetrahydrofuran-2,5-diyl, dioxolane-2,4-diyl, dioxolane-2,5-diyl, oxazole-2,4-diyl, oxazole-2,5-diyl, cyclopentane-1,3-diyl, cyclopentane-1,4-diyl, 1,4-phenylene, pyridine-2,5-diyl, pyrimidine-2,5-diyl, trans-1,4-cyclohexylene or dioxane-2,5-diyl, 1,4-naphthalenediyl, 1,3-naphthalenediyl, 1,5-naphthalenediyl, 1,6-naphthalenediyl, 1,7-naphthalenediyl, 2,3-naphthalenediyl, 2,4-naphthalenediyl, 2,5-naphthalenediyl, 2,6-naphthalenediyl, 2,7-naphthalenediyl, and 2,8-naphthalenediyl. It is especially preferred that C is selected from the group consisting of furan-2,5-diyl, tetrahydrofuran-2,5-diyl, oxazole-2,5-diyl, 1,4-phenylene, trans-1,4-cyclohexylene, and 2,6-naphthalenediyl.

The group $Z^1$ is preferably selected from the group consisting of —O—, —COO—, —OOC— and a single bond. It is especially preferred that $Z^1$ is selected from —O— or a single bond.

The groups $Z^2$ and $Z^3$ are preferably selected from the group consisting of —COO—, —OOC—, —CH$_2$CH$_2$—, —CH$_2$O—, —OCH$_2$—, —CH=CH—, —C≡C— and a single bond. It is especially preferred that $Z^2$ and $Z^3$ are selected from the group consisting of —COO—, —OOC—, —C≡C— and a single bond.

The group $R^1$ is preferably selected from the group consisting of H, —CN, —COOR, —OCOR, F, Cl, CF$_3$, OCF$_3$, OR, R, in which R represents a C$_{1-12}$ achiral alkyl, C$_{4-12}$ achiral alkenyl group with the double bond at position 3- or higher, or hydrogen. It is especially preferred that $R^1$ is selected from the group consisting of —CN, F, Cl, CF$_3$, OCF$_3$, OR, R, in which R represents a C$_{1-8}$ achiral alkyl group or hydrogen.

By the term "lower alkyl" it should be understood to include a C$_{1-6}$ achiral, branched or straight-chained alkyl group. Examples of lower alkyl groups that may be present in the compounds of the invention include methyl, ethyl, propyl, butyl, pentyl hexyl and the like.

By the term "lower alkenyl" it should be understood to include C$_{3-6}$ achiral, branched or straight-chained alkenyl group in which the double bond is at position 2- or higher. Examples of lower alkenyl groups that may be present in the compounds of the invention include 2-propenyl, 3-butenyl, 3-isopentenyl, 4-pentenyl, 5-hexenyl, 4-isohexenyl and the like.

By the term "lower alkoxy" it should be understood to include C$_{1-6}$ achiral, branched or straight-chained alkoxy group. Examples of lower alkoxy groups that may be present in the compounds of the invention include methoxy, ethoxy, propoxy, butoxy, pentoxy hexoxy and the like.

By the term "alkenyloxy" it should be understood to include $C_{3-6}$ achiral, branched or straight-chained alkenyloxy group in which the double bond is at position 2- or higher. Examples of lower alkenyloxy groups that may be present in the compounds of the invention include 2-propenyloxy, 3-butenyloxy, 4-pentenyloxy, 5-hexenyloxy and the like.

Preferably the polymerisable mesogenic residues $G^1$ and $G^2$ are each independently represented by the group of formula III

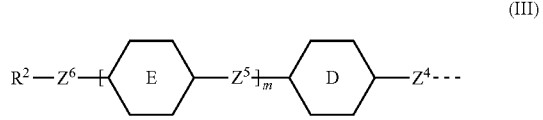

(III)

wherein
D is selected from the group consisting of 1,4-naphthalenediyl, 2,6-naphthalenediyl and 1,5-naphthalenediyl;
E is selected from the group consisting of optionally substituted 1,4-phenylene, pyridine-2,5-diyl, pyrimidine-2,5-diyl, trans-1,4-cyclohexylene, trans-1,4-cyclohexane, trans-1,3-dioxane-2,5-diyl, 1,4-naphthalenediyl, 2,6-naphthalenediyl and 1,5-naphthalenediyl;
m is 1 or 0,
$Z^4$ and $Z^5$ are independently selected from the group consisting of a single bond, —COO—, —OOC— and —OCOO—,
—CH$_2$—CH$_2$—, —CH$_2$O—, —OCH$_2$—,
—CH=CH—, —C≡C—, —(CH$_2$)$_4$— and
—(CH$_2$)$_3$O—;
$Z^6$ represent a single bond or a group of formula —(CH$_2$)$_q$X— in which q is an integer having a value of 1 to 18 and X is defined above, and in which one or two non-adjacent —CH$_2$— groups may be optionally replaced by —CH=CH— or in which one or two —CH$_2$— groups may be replaced by one or two additional linking groups X with the proviso that firstly the group $Z^6$ does not contain two adjacent heteroatoms and secondly when X is —CH$_2$, q can also have a value of 0.
$R^2$ represents a polymerisable group selected from the group consisting of CH$_2$=C(Ph)-, CH$_2$=CW—COO—, CH$_2$=CH—COO-Ph-, CH$_2$=CW—CO—NH—, CH$_2$=CH—O—, CH$_2$=CH—OOC—, Ph-CH=CH—, CH$_2$=CH-Ph-, CH$_2$=CH-Ph-O—, $R^3$-Ph-CH=CH—COO—, $R^3$—OOC—CH=CH-Ph-O— and 2-W-epoxyethyl
in which
W represents H, Cl, Ph or a lower alkyl,
$R^3$ represents a lower alkyl with the proviso that when $R^3$ is attached to a phenylene group (-Ph-) it may also represent hydrogen or a lower alkoxy.

The terms "Ph" and "Ph-" will be understood to indicate a phenyl group. The term "-Ph-" will be understood to mean any isomer of phenylene, namely 1,2-phenylene, 1,3-phenylene or 1,4-phenylene, except where the context requires otherwise.

It is especially preferred that the groups D and E contain no substitution.

It is preferred that the groups $Z^4$ and $Z^5$ are selected from the group consisting of a single bond, —COO—, —OOC—, —OCOO—, —CH$_2$—CH$_2$—, —CH$_2$O—, —OCH$_2$—, —CH=CH— and —C≡C—. It is especially preferred that $Z^4$ and $Z^5$ represent a single bond, —C≡C—, —COO—, —OCOO—, or —OOC—.

$Z^6$ may be optionally substituted by one or more halogen atoms, preferably one or more fluorine atoms. It is preferred that q has a value of 1 to 11. It is also preferred that $Z^6$ contains no substitution. It is further preferred that, for the group $Z^6$, X is selected from —CH$_2$—, —O—, —COO—, OCOO and —OOC—, especially —CH$_2$— or —O—.

It is preferred that the group $R^2$ is selected from the group consisting of CH$_2$=CW—COO— and CH$_2$=CH—O—.

It is preferred that the sum of the two integers m for each of the groups $G^1$ and $G^2$ is 0 or 1. It is especially preferred that for both $G^1$ and $G^2$ m has a value of 0.

The compounds of the invention may be readily prepared using procedures well known to a skilled person.

The starting materials are commercially available or may be readily prepared and are well known to a skilled person.

The compounds of the invention are preferably prepared by forming a ring that includes a lateral group prior to linking the mesogenic residues. Alternatively, the compounds may be prepared by forming a ring that includes a polymerisable mesogenic residue prior to linking the lateral group. A second aspect of the invention therefore provides a method of preparation of a compound of formula (I), the method comprising forming a ring that includes a lateral group and subsequently linking the mesogenic residue thereto. The mesogenic residues $G^1$ and $G^2$ are connected to the central ring simultaneously if $G^1$ and $G^2$ are identical.

A LCP material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer. Polymerization may be initiated by thermal treatment or by exposure to actinic light, which preferably comprises UV-light. A LCP-material may comprise only a single type of liquid crystal compound, but may also comprise additional polymerizable and/or non-polymerizable compounds, wherein not all of the compounds have to be liquid crystal compounds. Further, an LCP material may contain additives, including but not limited to antioxidants, initiators, such as photoinitiators, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, such as e.g. phenol derivatives, such as 4-ethoxyphenol or 2,6-di-tert-butyl-4-methylphenol (BHT), lubricating agents; dispersing agents; a polymeric binder and/or monomeric compounds which can be converted into the polymeric binder by polymerization, or, in the case of emulsion coatings and printing inks, a dispersion auxiliary, such as disclosed in U.S. Pat. No. 5,798,147; hydrophobing agents, adhesive agents, flow improvers, defoaming agents, deaerators, diluents, auxiliaries, colorants, dyes and pigments, curing inhibitors, such as hydroquinone, p-tert.-butyl catechol; 2,6-di tert.-butyl-p-methylphenol; phenothiazine; N-phenyl-2-naphthylamine; or a photo-orientable monomer or oligomer or polymer as described in EP 1 090 325 B, a chiral additive, isotropic or anisotropic fluorescent and/or non-fluorescent dyes, in particular dichroic dyes.

It will be appreciated that the compounds of the invention may be used in the preparation of LCP mixtures. Such mixtures may be prepared by admixing a compound of formula (I) with one or more additional components. An organic solvent may also be used in the preparation of these mixtures. A third aspect of the invention therefore provides a LCP mixture comprising a compound of formula (I) and one or more additional components. The one or more additional components present in the LCP mixture may be further compounds of formula (I), other mesogenic compounds, compounds that are compatible with a mesogenic molecular architecture or chiral dopants for the induction of helical pitch. The LCP mixture may also include a suitable organic solvent. Examples of solvents that may be used in the preparation of such liquid crystalline mixtures include but not limited to, acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), 1,3-dioxolane (DXG), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), propylene glycol monoacetate, propylene glycol diacetate, dipropylene glycol monomethyl ether, dimethyl sulfoxide (DMSO).

Most preferred are cyclopentanone (CP), cyclohexanone (CH), methyl isobutyl ketone (MIBK), methylethylketone (MEK), ethyl acetate (EA), 1-methoxy-2-propanol acetate (MPA), 1,3-dioxolane (DXG), dimethyl sulfoxide (DMSO).

Dichroic dyes refer to dyes in which the absorbance varies between a longer axis direction and a shorter axis direction of a molecule. Dichroic dyes preferably absorb visible light. Examples of dichroic dyes include azo dyes, acridine dyes, oxazine dyes, cyanine dyes, naphthalene dyes and anthraquinone dyes. These dichroic dyes can be used individually or in combination. The amount of dichroic dye used relative to 100 parts by mass of the liquid crystal mixture is 0.01 parts by mass to 40 parts by mass, and preferably 0.05 parts by mass to 15 parts by mass.

The compounds of the invention may also be used in the formation of a LCP layer by casting a LCP compound according to the first aspect of the invention or a LCP mixture according to the third aspect of the invention onto a substrate. A fourth aspect of the invention therefore provides a method forming a LCP network comprising forming a LCP layer including a compound of formula (I) and cross-linking the layer. LCP mixtures according to the third aspect of the invention may also be used in the manufacture of LCP networks in a similar way.

The invention also includes, in a fifth aspect of the invention, a cross-linked LCP network comprising a compound of formula (I) in a cross-linked form. Cross-linked LCP networks comprising a mixture according to the third aspect of the invention in cross-linked form may also be included in this aspect of the invention.

A sixth aspect of the invention provides the use of a compound of formula (I) in the preparation of an optical or an electro-optical device. The use, in the preparation of an optical or electro-optical device, of liquid crystalline mixtures according to the third aspect of the invention is also included in this aspect of the invention.

A seventh aspect of the invention provides an optical or an electro-optical device comprising a compound of formula (I) in a cross-linked state. An optical or electro-optical device comprising a LCP liquid crystalline mixture in a cross-linked state according to the third aspect of the invention is also included in this aspect of the invention.

The LCP mixture can be applied on a support. The support may be rigid or flexible and can have any form or shape. For example, it may be a body with complex surfaces. In principle it may consist of any material. Preferably, the support comprises plastic, glass or metal or is a silicon wafer. In case the support is flexible, it is preferred that the support is a plastic or metal foil. Preferably, the surface of the support is flat. For some applications the support may comprise topographical surface structures, such as microstructures like micro lenses or micro-prisms, or structures exhibiting abrupt changes of the shape, such as rectangular structures. Preferably, the support is transparent.

The support may be moving during the deposition of the LCP mixture. For example, a layer of the LCP mixture may be produced in a continuous roll to roll process by depositing the material composition onto a moving flexible foil, which is preferably plastic or metallic. The resulting film may then be wound on a roll together with the support foil or the film may be released from the support and is then wound as a free standing film, without the support.

The support may have additional layers, such as organic, dielectric or metallic layers. The layers can have different functions, for example an organic layer can be coated as a primer layer which increases compatibility of the materials to be coated with the support. Metallic layers may be used as electrodes, for example when used in electrooptical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a retarder film, a polarizer, such as a polarizing film or a sheet polarizer, a reflective polarizer, such as the commercially available Vikuity™ DBEF film.

The LCP mixture may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

A layer of a LCP mixture does not have to cover the full surface of a support. Rather than that, the layer may be applied in the form of a pattern, for example by printing, or may after deposition be treated to have the form of a pattern, for example by photo-lithographic methods.

Alignment of the LCP can be achieved by any known means for aligning liquid crystals. For example, the support may have an aligning surface, which shall mean that the surface has the capability to align liquid crystals. The support may already provide the alignment without further treatment. For example, if a plastic substrate is used as a support, it may provide alignment on the surface due to the manufacturing method, for example extrusion or stretching of the substrate. It is also possible to brush the support or imprint a directional microstructure to generate alignment capability. Alternatively, a thin layer of a material may be coated on the support which is especially designed regarding alignment performance. The layer may be further brushed or treated to have a directional microstructure on the surface, for example by imprinting. If the thin layer comprises a photo-orientable substance, alignment can be generated by exposure to aligning light.

The aligning surface of the substrate may exhibit a pattern of alignment directions in order to define an orientation pattern for the liquid crystals in the LCP layer. Preferably, an alignment layer comprising a photo-orientable substance is used for this purpose and the alignment pattern is generated by selective exposure to aligning light of different polarization planes.

The invention will now be described with reference to the following non-limiting examples.

These examples are provided by way of illustration only. Variations on these examples falling within the scope of the invention will be apparent to a skilled person.

EXAMPLES

Definitions Used in the Examples $^1$H NMR: $^1$H nuclear magnetic resonance spectroscopy
DMSO-$d_6$: dimethylsulfoxide deuterated
300 MHz: 300 MegaHertz
m: multiplet, d: doublet, dd: doublet doublet, t: triplet, s: singulet
DMF: dimethylformamide
HCl solution (25%): volume percent
$CH_2Cl_2$: dichloromethane
THF: tetrahydrofuran In the following examples, the thermotropic phases are abbreviated as follow:

$T_{(Cr-N)}$: transition temperature from crystal phase to nematic phase
$T_{(N-I)}$: transition temperature from nematic phase to isotrope phase

Example 1: Preparation of 4-[4-(6-hydroxyhexoxy)phenyl]benzonitrile Compound 1

A mixture of 39.1 g (0.2 mol) of 4-(4-cyanophenyl)phenol, 34.5 g (0.26 mol) of potassium carbonate, 4.35 g (0.026 mol) of potassium iodide and 35.5 g (0.26 mol) of 6-chlorohexanol in DMF is heated at 80° C. for 18 h. The solution is then cooled down and poured into 1.2 L of water. The obtained precipitate is filtered off and washed two times with 2 L of water. The solid is then recrystallized from acetonitrile to give 50.4 g of 4-[4-(6-hydroxyhexoxy)phenyl]benzonitrile as a white crystalline powder.

Example 2: Preparation of 4-[4-(8-hydroxyoctoxy)phenyl]benzonitrile Compound 2

The compound 2 is prepared according to the process described in example 1 for compound 1 with the proviso that 6-chlorohexanol is replaced by 8-chlorooctanol.

Example 3: Preparation of 4-[4-(10-hydroxydecoxy)phenyl]benzonitrile Compound 3

The compound 3 is prepared according to the process described in example 1 for compound 1 with the proviso that 6-chlorohexanol is replaced by 10-chlorodecanol.

Example 4: Preparation of 4-[4-(11-hydroxyundecoxy)phenyl]benzonitrile Compound 4

The compound 4 is prepared according to the process described in example 1 for compound 1 with the proviso that 6-chlorohexanol is replaced by 11-chloroundecanol.

Example 5: Preparation of 6-[4-(4-cyanophenyl)phenoxy]hexyl 2,5-dihydroxybenzoate Compound 5

52.1 g (0.51 mol) of triethylamine is added dropwise to a solution of 50.4 g (0.17 mol) of 4-[4-(6-hydroxyhexoxy)phenyl]benzonitrile dissolved in 450 mL of THF. The mixture is cooled down to 0° C. and 23.5 g (0.204 mol) of methanesulfonyl chloride is slowly added. After 3 hours of stirring, the mixture is filtered off under silica and dried by removing the solvent under reduced pressure to give 70.7 g of a yellow oil of 6-[4-(4-cyanophenyl)phenoxy]hexyl methanesulfonate. 27.2 g (0.175 mol) of 2,3,4,6,7,8,9,10-octahydropyrimido[1,2-a]azepine is added to a solution of 28.1 g (0.179 mol) of 2,5 dihydroxybenzoic acid in 190 mL of DMF. 7.65 g of sodium iodide, 70.7 g (0.170 mol) 6-[4-(4-cyanophenyl)phenoxy]hexyl methanesulfonate in 190 mL of DMF is introduced onto the mixture. After 4 hours, the resulting mixture was poured onto 2 L of cold water. The precipitate is filtered off and washed 2 times with water. The pale yellow solid is recrystallized in $CH_3CN$ to give 57.7 g of 6-[4-(4-cyanophenyl)phenoxy]hexyl 2,5-dihydroxybenzoate as a white powder.

Example 6: Preparation of 8-[4-(4-cyanophenyl)phenoxy]octyl 2,5-dihydroxybenzoate Compound 6

The compound 6 is prepared according to the process described in example 5 for compound 5 with the proviso that 4-[4-(6-hydroxyhexoxy)phenyl]benzonitrile is replaced by 4-[4-(8-hydroxyoctoxy)phenyl]benzonitrile compound 2.

Example 7: Preparation of 10-[4-(4-cyanophenyl)phenoxy]decyl 2,5-dihydroxybenzoate Compound 7

The compound 7 is prepared according to the process described in example 5 for compound 5 with the proviso that 4-[4-(6-hydroxyhexoxy)phenyl]benzonitrile is replaced by compound 3.

Example 8: Preparation of 11-[4-(4-cyanophenyl)phenoxy]undecyl 2,5-dihydroxybenzoate Compound 8

The compound 8 is prepared according to the process described in example 5 for compound 5 with the proviso that 4-[4-(6-hydroxyhexoxy)phenyl]benzonitrile is replaced by compound 4.

Example 9: Preparation of 6-(6-hydroxyhexoxy)naphthalene-2-carboxylic acid Compound 9

A mixture of 76.3 g (0.377 mol) of methyl 6-hydroxynaphthalene-2-carboxylate, 68.5 g (0.49 mol) of potassium carbonate, 8.2 g (0.049 mol) of potassium iodide and 67 g (0.49 mol) of 6-chlorohexanol in 250 mL of DMF is heated to 80° C. for 18 h. The solution is then cooled down and poured into 2.6 L of cold water. The precipitate is filtered off and washed two times with water. The product is then recrystallized from acetonitrile to give 94.2 g of a white powder. A mixture of this solid in 680 mL of DMF, 37.95 g of hydroxide sodium, 340 mL of methanol and 75 mL of water is stirred at 60° C. for 4 hours. 122.2 g of hydrochloric acid in 782 mL of water is added dropwise. The suspension is filtered off to give 85.8 g of white solid of 6-(6-hydroxyhexoxy)naphthalene-2-carboxylic acid

Example 10: Preparation of 6-(8-hydroxyoctoxy)naphthalene-2-carboxylic acid Compound 10

The compound 10 is prepared according to the process described in example 9 for compound 9 with the proviso that 6-chlorohexanol is replaced by 8-chlorooctanol.

Example 11: Preparation of 6-(8-hydroxydecoxy)naphthalene-2-carboxylic acid Compound 11

The compound 11 is prepared according to the process described in example 9 for compound 9 with the proviso that 6-chlorohexanol is replaced by 10-chlorodecanol

Example 12: Preparation of 6-(11-hydroxyundecoxy)naphthalene-2-carboxylic acid Compound 12

The compound 12 is prepared according to the process described in example 9 for compound 9 with the proviso that 6-chlorohexanol is replaced by 11-chloroundecanol

Example 13: Preparation of [3-[6-[4-(4-cyanophenyl)phenoxy]hexoxycarbonyl]-4-[6-(6-prop-2-enoyloxyhexoxy)naphthalene-2-carbonyl]oxy-phenyl]6-(6-prop-2-enoyloxyhexoxy)naphthalene-2-carboxylate Compound 13

45.3 g (0.357 mol) of chloropropionic acid chloride in 50 mL of N-Methyl-2-pyrrolidon is added dropwise to 85.8 g (0.297 mol) of 6-(6-hydroxyhexoxy)naphthalene-2-carboxylic acid in 220 ml of N-Methyl-2-pyrrolidon. The mixture is stirred at room temperature for 2 h. Then the solution is poured onto 810 mL of water and the solid is filtered off, dried under vacuum to give 105.25 g.

6.1 g (0.0161 mol) of the previous product, 3 g (0.0070 mol) of 6-[4-(4-cyanophenyl)phenoxy]hexyl 2,5-dihydroxybenzoate, 0.2 g of 4-(Dimethylamino)-pyridin and 3.65 g of dicyclohexylcarbodiimide (0.0175 mol) are mixed in 120 mL $CH_2Cl_2$ and stirred at room temperature overnight. The solution is filtered through hyflo silica and the solution is dried under vacuum to give a white solid. The solid is dissolved in 50 mL $CH_2Cl_2$ with 3.2 g of triethylamine. The mixture is stirred overnight at 40° C., filtered off and dried under vacuum. The white solid is recrystallized in acetonitrile to give 5.95 g of a white solid [3-[6-[4-(4-cyanophenyl)phenoxy]hexoxycarbonyl]-4-[6-(6-prop-2-enoyloxyhexoxy)naphthalene-2-carbonyl]oxy-phenyl]6-(6-prop-2-enoyloxyhexoxy)naphthalene-2-carboxylate compound 13

Liquid crystal phase Transition: Compound 13 was observed with a polarizing microscope under cross polarizers to determine its phase transition temperature. As a result, when the temperature increased, the crystalline phase changed into nematic phase at 105° C. ($T_{(Cr-N)}$) and the isotropic phase appeared to be above 150° C. ($T_{(N-I)}$).

$^1$H NMR (300 MHz) in DMSO-$d_6$: $^1$H NMR (300 MHz) in DMSO-$d_6$: 8.80 (s, 2H), 8.11 (m, 4H), 7.95 (m, 3H), 7.86 (d, 4H), 7.80 (d, 1H), 7.76 (d, 2H), 7.58 (d, 1H), 7.43 (d, 2H), 7.28 (d, 2H), 6.94 (d, 2H), 6.32 (m, 2H), 6.13 (m, 2H), 5.93 (m, 2H), 4.10 (m, 10H), 3.73 (t, 2H), 2-0.8 (m, 24H).

Example 14: (acry6-8) Preparation of [3-[8-[4-(4-cyanophenyl)phenoxy]octoxycarbonyl]-4-[6-(6-prop-2-enoyloxyhexoxy)naphthalene-2-carbonyl]oxy-phenyl]6-(6-prop-2-enoyloxyhexoxy)naphthalene-2-carboxylate Compound 14

The compound 14 is prepared according to the process described in example 13 for compound 13 with the proviso that 6-[4-(4-cyanophenyl)phenoxy]hexyl 2,5-dihydroxybenzoate is replaced by 8-[4-(4-cyanophenyl)phenoxy]octyl 2,5-dihydroxybenzoate.

Liquid crystal phase transition: $T_{(Cr-N)}$:96° C., $T_{(N-I)}$>150° C.

$^1$H NMR (300 MHz) in DMSO-$d_6$: $^1$H NMR (300 MHz) in DMSO-$d_6$: 8.80 (s, 2H), 8.09 (m, 4H), 7.94 (m, 3H), 7.83 (d, 4H), 7.80 (d, 1H), 7.66 (d, 2H), 7.58 (d, 1H), 7.45 (d, 2H), 7.28 (d, 2H), 7.02 (d, 2H), 6.30 (m, 2H), 6.16 (m, 2H), 5.92 (m, 2H), 4.14 (m, 10H), 3.90 (t, 2H), 1.9-0.7 (m, 28H).

Example 15: (acry6-10) Preparation of [3-[10-[4-(4-cyanophenyl)phenoxy]decoxycarbonyl]-4-[6-(6-prop-2-enoyloxyhexoxy)naphthalene-2-carbonyl]oxy-phenyl]6-(6-prop-2-enoyloxyhexoxy)naphthalene-2-carboxylate Compound 15

The compound 15 is prepared according to the process described in example 13 for compound 13 with the proviso that 6-[4-(4-cyanophenyl)phenoxy]hexyl 2,5-dihydroxybenzoate is replaced by 10-[4-(4-cyanophenyl)decoxy]octyl 2,5-dihydroxybenzoate.

Liquid crystal phase transition: $T_{(Cr-N)}$:107° C., $T_{(N-I)}$>150° C.

$^1$H NMR (300 MHz) in DMSO-$d_6$: 8.68 (d, 2H), 7.98 (m, 4H), 7.84 (m, 3H), 7.73 (d, 4H), 7.67 (dd, 1H), 7.58 (d, 2H), 7.47 (d, 1H), 7.36 (d, 2H), 7.17 (d, 2H), 6.92 (d, 2H), 6.24 (m, 2H), 6.10 (m, 2H), 5.81 (m, 2H), 3.98 (m, 10H), 3.85 (t, 2H), 1.9-0.7 (m, 32H).

Example 16: Preparation of [3-[11-[4-(4-cyanophenyl)phenoxy]undecoxycarbonyl]-4-[6-(6-prop-2-enoyloxyhexoxy)naphthalene-2-carbonyl]oxy-phenyl]6-(6-prop-2-enoyloxyhexoxy)naphthalene-2-carboxylate Compound 16

The compound 16 is prepared according to the process described in example 13 for compound 13 with the proviso that 6-[4-(4-cyanophenyl)phenoxy]hexyl 2,5-dihydroxybenzoate is replaced by 11-[4-(4-cyanophenyl)undecoxy]octyl 2,5-dihydroxybenzoate.

Liquid crystal phase transition: $T_{(Cr-N)}$: 90° C., $T_{(N-I)}$:141° C.

Example 17: Preparation of [3-[6-[4-(4-cyanophenyl)phenoxy]hexoxycarbonyl]-4-[6-(11-prop-2-enoyloxyundecoxy)naphthalene-2-carbonyl]oxy-phenyl]6-(6-prop-2-enoyloxyhexoxy)naphthalene-2-carboxylate Compound 17

The compound 17 is prepared according to the process described in example 13 for compound 13 with the proviso that 6-(6-hydroxyhexoxy)naphthalene-2-carboxylic acid is replaced by 6-(11-hydroxyundecoxy)naphthalene-2-carboxylic acid Liquid crystal phase transition: $T_{(Cr-N)}$:120° C., $T_{(N-I)}$>150° C.

Example 18: Preparation of [3-[8-[4-(4-cyanophenyl)phenoxy]octoxycarbonyl]-4-[6-(11-prop-2-enoyloxyundecoxy)naphthalene-2-carbonyl]oxy-phenyl] 6-(6-prop-2-enoyloxyhexoxy)naphthalene-2-carboxylate Compound 18

The compound 18 is prepared according to the process described in example 17 for compound 17 with the proviso that 6-[4-(4-cyanophenyl)phenoxy]hexyl 2,5-dihydroxybenzoate is replaced by 8-[4-(4-cyanophenyl)phenoxy]octyl 2,5-dihydroxybenzoate Liquid crystal phase transition: $T_{(Cr-N)}$:109° C., $T_{(N-I)}$>150° C.

Example 19: Preparation of [3-[10-[4-(4-cyanophenyl)phenoxy]decoxycarbonyl]-4-[6-(11-prop-2-enoyloxyundecoxy)naphthalene-2-carbonyl]oxy-phenyl]6-(6-prop-2-enoyloxyhexoxy)naphthalene-2-carboxylate Compound 19

The compound 19 is prepared according to the process described in example 17 for compound 17 with the proviso that 6-[4-(4-cyanophenyl)phenoxy]hexyl 2,5-dihydroxybenzoate is replaced by 10-[4-(4-cyanophenyl)phenoxy]decyl 2,5-dihydroxybenzoate.

Liquid crystal phase transition: $T_{(Cr-N)}$:98° C., $T_{(N-I)}$>150° C.

$^1$H NMR (300 MHz) in DMSO-$d_6$: 8.82 (d, 2H), 8.15 (m, 4H), 7.95 (m, 6H), 7.85 (d, 4H), 7.71 (m, 3H), 7.60 (d, 1H), 7.48 (s, 2H), 7.30 (d, 2H), 7.15 (d, 2H), 6.35 (m, 2H), 6.20 (m, 2H), 5.94 (m, 2H), 4.10 (m, 10H), 3.95 (t, 2H), 1.9-0.7 (m, 54H).

Example 20: Preparation of [3-[10-[4-(4-cyanophenyl)phenoxy]decoxycarbonyl]-4-[6-(10-prop-2-enoyloxydecoxy)naphthalene-2-carbonyl]oxy-phenyl]6-(6-prop-2-enoyloxyhexoxy)naphthalene-2-carboxylate Compound 20

The compound 20 is prepared according to the process described in example 19 for compound 19 with the proviso that 6-(11-hydroxyundecoxy)naphthalene-2-carboxylic acid is replaced by 6-(10-hydroxydecoxy)naphthalene-2-carboxylic acid Liquid crystal phase transition: $T_{(Cr-N)}$:80° C., $T_{(N-I)}$>150° C.

Example 21: Preparation of [3-[6-[4-(4-cyanophenyl)phenoxy]hexoxycarbonyl]-4-[6-(4-prop-2-enoyloxybutoxycarbonyloxy)naphthalene-2-carbonyl]oxy-phenyl]6-(4-prop-2-enoyloxybutoxycarbonyloxy)naphthalene-2-carboxylate Compound 21

5 g (0.0140 mol) of 6-(4-prop-2-enoyloxybutoxycarbonyloxy)naphthalene-2-carboxylic acid (prepared according to the process described in the U.S. Pat. No. 7,670,505 B2) and 35 mg of BHT are mixed in 50 mL of $CH_2Cl_2$. 3.5 ml of DMF and 1.9 g (0.0145 mol) of oxalyl chloride are added to this solution. The reaction mixture is subsequently stirred at room temperature for 1 hour and then the excess of oxalyl chloride is removed under reduced pressure. The product is dissolved in $CH_2Cl_2$ and added dropwise to a solution of 2.7 g (0.0062 mol) of 6-[4-(4-cyanophenyl)phenoxy]hexyl 2,5-dihydroxybenzoate compound 5, 3.85 g of N,N-dimethylcyclohexylamine and 5 mg of 2,6-di-tert-butyl-4-methylphenol in 50 mL of $CH_2Cl_2$. The resulting mixture is stirred at room temperature for 4 h. Afterward, 3 g of hydrochloric acid 25% and 100 mL of water are added and the phases separated. The organic phase is washed two times with saturated aqueous sodium chloride solution, dried over anhydrous sodium sulfate and concentrated under reduced pressure. The residue is recrystallized on $CH_3CN$ to give 2.45 g of a white solid compound 21.

Liquid crystal phase transition: $T_{(Cr-N)}$: 99° C., $T_{(N-I)}$>150° C.

$^1$H NMR (300 MHz) in DMSO-$d_6$: 8.95 (s, 2H), 8.32 (m, 2H), 8.16 (m, 4H), 7.96 (d, 3H), 7.80 (m, 5H), 7.57 (m, 5H), 6.96 (d, 2H), 6.34 (m, 2H), 6.20 (m, 2H), 5.96 (m, 2H), 4.26 (m, 4H), 4.09 (m, 6H), 3.77 (t, 2H), 1.75 (m, 8H), 1.6-1.2 (m, 4H), 1.15 (m, 4H).

Example 22: Preparation of [3-[8-[4-(4-cyanophenyl)phenoxy]octoxycarbonyl]-4-[6-(4-prop-2-enoyloxybutoxycarbonyloxy)naphthalene-2-carbonyl]oxy-phenyl]6-(4-prop-2-enoyloxybutoxycarbonyloxy)naphthalene-2-carboxylate Compound 22

The compounds 22 is prepared according to the process described in example 21 for compound 21 with the proviso that 6-[4-(4-cyanophenyl)phenoxy]hexyl 2,5-dihydroxybenzoate is replaced by 8-[4-(4-cyanophenyl)phenoxy]octyl 2,5-dihydroxybenzoate.

Liquid crystal phase transition: $T_{(Cr-N)}$:103° C., $T_{(N-I)}$>150° C.

Example 22A: Preparation of 10-(4-phenylphenoxy)decan-1-ol Compound 22A

The compound 22A is prepared according to the process described in example 3 for compound 3 with the proviso that 4-(4-cyanophenyl)phenol is replaced by 4-phenylphenol.

Example 22B: Preparation of 10-[4-(p-tolyl)phenoxy]decan-1-ol compound 22B

The compound 22B is prepared according to the process described in example 3 for compound 3 with the proviso that 4-(4-cyanophenyl)phenol is replaced by 4-(p-tolyl)phenol.

Example 22C: Preparation of 6-(10-hydroxydecoxy)naphthalene-2-carbonitrile Compound 22C The compound 22C is prepared according to the process described in example 3 for compound 3 with the proviso that 4-(4-cyanophenyl)phenol is replaced by 6-hydroxynaphthalene-2-carbonitrile.

Example 22D: Preparation of 6-(3-hydroxypropoxy)naphthalene-2-carboxylic acid Compound 22D The compound 22D is prepared according to the process described in example 9 for compound 9 with the proviso that 6-chlorohexanol is replaced by 3-bromopropanol.

Example 22E: Preparation of 10-(4-phenylphenoxy)decyl 2,5-dihydroxybenzoate Compound 22E The compound 22E is prepared according to the process described in example 5 for compound 5 with the proviso that 4-[4-(6-hydroxyhexoxy)phenyl]benzonitrile is replaced by 10-(4-phenylphenoxy)decan-1-ol compound.

Example 22F: Preparation of 10-[4-(p-tolyl)phenoxy]decyl 2,5-dihydroxybenzoate Compound The compound 22F is prepared according to the process described in example 5 for compound 5 with the proviso that 4-[4-(6-hydroxyhexoxy)phenyl]benzonitrile is replaced by 10-[4-(p-tolyl)phenoxy]decan-1-ol compound.

Example 22G: Preparation of 10-[(6-cyano-2-naphthyl)oxy]decyl 2,5-dihydroxybenzoate Compound 22G The compound 22G is prepared according to the process described in example 5 for compound 5 with the proviso that 4-[4-(6-hydroxyhexoxy)phenyl]benzonitrile is replaced by 6-(10-hydroxydecoxy)naphthalene-2-carbonitrile compound 22G.

Example 22H: Preparation of [3-[10-(4-phenylphenoxy)decoxycarbonyl]-4-[6-(6-prop-2-enoyloxyhexoxy)naphthalene-2-carbonyl]oxy-phenyl]6-(6-prop-2-enoyloxyhexoxy)naphthalene-2-carboxylate compound 22H The compound 22H is prepared according to the process described in example 13 for compound 13 with the proviso that 6-[4-(4-cyanophenyl)phenoxy]hexyl 2,5-dihydroxybenzoate is replaced by 10-(4-phenylphenoxy)decyl 2,5-dihydroxybenzoate.

Liquid crystal phase transition: $T_{(Cr-N)}$: 90° C., $T_{(N-I)}$: 127° C.

$^1$H NMR (300 MHz) in DMSO-$d_6$: 8.78 (d, 2H), 8.12 (m, 4H), 7.96 (m, 3H), 7.75 (dd, 1H), 7.57 (m, 5H), 7.42 (dd, 4H), 7.28 (m, 3H), 6.97 (d, 2H), 6.32 (m, 2H), 6.18 (m, 2H), 5.89 (m, 2H), 4.10 (m, 10H), 3.93 (t, 2H), 1.9-0.7 (m, 32H).

Example 22I: Preparation of [4-[6-(6-prop-2-enoyloxyhexoxy)naphthalene-2-carbonyl]oxy-3-[10-[4-(p-tolyl)phenoxy]decoxycarbonyl]phenyl]6-(6-prop-2-enoyloxyhexoxy)naphthalene-2-carboxylate Compound 22I The compound 22I is prepared according to the process described in example 13 for compound 13 with the proviso that 6-[4-(4-cyanophenyl)phenoxy]hexyl 2,5-dihydroxybenzoate is replaced by 10-[4-(p-tolyl)phenoxy]decyl 2,5-dihydroxybenzoate.

Liquid crystal phase transition: $T_{(Cr-N)}$: 93° C., $T_{(N-I)}$: 152° C.

$^1$H NMR (300 MHz) in DMSO-$d_6$: 8.80 (d, 2H), 8.12 (m, 4H), 7.94 (m, 3H), 7.76 (dd, 1H), 7.52 (m, 7H), 7.24 (dd, 4H), 6.96 (d, 2H), 6.30 (m, 2H), 6.17 (m, 2H), 5.95 (m, 2H), 4.13 (m, 10H), 3.93 (t, 2H), 2.32 (s, 3H), 1.9-0.7 (m, 32H).

Example 22J: Preparation of [3-[10-[(6-cyano-2-naphthyl)oxy]decoxycarbonyl]-4-[6-(6-prop-2-enoyloxyhexoxy)naphthalene-2-carbonyl]oxy-phenyl]6-(6-prop-2-enoyloxyhexoxy)naphthalene-2-carboxylate Compound 22J The compound 22J is prepared according to the process described in example 13 for compound 13 with the proviso that 6-[4-(4-cyanophenyl)phenoxy]hexyl 2,5-dihydroxybenzoate is replaced by 10-[(6-cyano-2-naphthyl)oxy]decyl 2,5-dihydroxybenzoate.

Liquid crystal phase transition: $T_{(Cr-N)}$: 71° C., $T_{(N-I)}$: 137° C.

$^1$H NMR (300 MHz) in DMSO-$d_6$: 8.80 (d, 2H), 8.45 (d, 1H), 8.11 (m, 4H), 7.96 (m, 5H), 7.75 (m, 2H), 7.58 (d, 1H), 7.45 (dd, 3H), 7.29 (d, 3H), 6.30 (m, 2H), 6.19 (m, 2H), 5.94 (m, 2H), 4.10 (m, 12H), 3.85 (t, 2H), 1.9-0.6 (m, 32H).

Example 22K: Preparation of [3-[10-[4-(4-cyanophenyl)phenoxy]decoxycarbonyl]-4-[6-(3-prop-2-enoyloxypropoxy)naphthalene-2-carbonyl]oxy-phenyl]6-(3-prop-2-enoyloxypropoxy)naphthalene-2-carboxylate compound 22K The compound 22K is prepared according to the process described in example 13 for compound 13 with the proviso that 6-[4-(4-cyanophenyl)phenoxy]hexyl 2,5-dihydroxybenzoate is replaced by 10-[(6-cyano-2-naphthyl)oxy]decyl 2,5-dihydroxybenzoate and 6-(6-hydroxyhexoxy)naphthalene-2-carboxylic acid is replaced by 6-(3-hydroxypropoxy)naphthalene-2-carboxylic acid.

Liquid crystal phase transition: $T_{(Cr-N)}$: 110.4° C., $T_{(N-I)}$>160° C.

$^1$H NMR (300 MHz) in DMSO-$d_6$: 8.79 (d, 2H), 8.10 (m, 4H), 7.94 (m, 3H), 7.81 (d, 5H), 7.66 (d, 2H), 7.57 (d, 1H), 7.48 (d, 2H), 7.29 (d, 2H), 7.02 (d, 2H), 6.35 (m, 2H), 6.16 (m, 2H), 5.95 (m, 2H), 4.33 (m, 6H), 4.25 (t, 2H), 4.07 (t, 2H), 3.95 (t, 2H), 2.17 (m, 4H), 1.64 (t, 2H), 1.5-0.5 (m, 14H).

Example 23A: Preparation of an Orientation Layer Using Photoalignment Materials A glass substrate is spin-coated with a Photoalignment Composition (2% solid content of a photoaligning material in cyclopentanone as described in patent publication WO2012/085048). The film is dried at 80° C. for 30 s and the resulting film thickness is about 100 nm. Then, the film is exposed to aligning light, which is collimated and linearly polarized UV (LPUV) light (280-320 nm) with 250 mJ/cm$^2$. The plane of polarization is 0° with regard to a reference edge on the substrate.

Example 23

A 15.0 w % solution is prepared by mixing the 14.79 w % compound 16, 0.03 w % of 2,6-di-tert-butyl-4-methylphenol, 0.18 w % of Irgacure 369 in cyclohexanone and stirred thoroughly till the solid is completely dissolved at room temperature. The above polymer solution was spin-coated onto a glass plate with the orientation layer of Example 23A to form a liquid crystal film. This film is dried at 90° C. for 5 min onto a temperature controlled hot plate. The sample is cooled down to room temperature and then photo-polymerised by irradiation with UV light using a Mercury lamp for approximately 2 min at room temperature under N$_2$ atmosphere to fix the orientation state of the liquid crystal.

The resulting film exhibited a very well oriented nematic mesophase at room temperature.

Example 24

A film is prepared as in Example 23, with the single difference that the compound 16 is replaced by the compound 21. This film was dried at 100° C. for 5 min onto a temperature controlled hot plate. The resulting film exhibited a very well oriented nematic mesophase at room temperature.

Example 25

A film is prepared as in Example 23, with the single difference that the compound 16 is replaced by compound 22. This film was dried at 100° C. for 5 min onto a temperature controlled hot plate. The resulting film exhibited a well oriented nematic mesophase at room temperature.

Example 26

A film is prepared as in Example 23, with the single difference that Compound 16 is replaced by compound 15. This film was dried at 100° C. for 5 min onto a temperature controlled hot plate. The resulting film exhibited a very well oriented nematic mesophase at room temperature.

Example 26B

A film is prepared as in Example 23, with the single difference that Compound 16 is replaced by compound 22H. This film was dried at 100° C. for 5 min onto a temperature controlled hot plate. The resulting film exhibited a very well oriented nematic mesophase at room temperature.

Example 26C

A film is prepared as in Example 23, with the single difference that Compound 16 is replaced by compound 22I. This film was dried at 100° C. for 5 min onto a temperature controlled hot plate. The resulting film exhibited a very well oriented nematic mesophase at room temperature.

Example 26D

A film is prepared as in Example 23, with the single difference that Compound 16 is replaced by compound 22J. This film was dried at 100° C. for 5 min onto a temperature controlled hot plate. The resulting film exhibited a very well oriented nematic mesophase at room temperature.

Example 26E

A film is prepared as in Example 23, with the single difference that Compound 16 is replaced by compound 22K. This film was dried at 100° C. for 5 min onto a temperature controlled hot plate. The resulting film exhibited a very well oriented nematic mesophase at room temperature.

Comparative Example 1

A film is prepared as in Example 23, with the single difference that compound 16 is replaced by 10-[4-(4-cyanophenyl)phenoxy]decyl 2,5-bis[[4-(6-prop-2-enoyloxyhexoxy)benzoyl]oxy]benzoate described in the patent application WO2011/003846 A1. This film was dried at 90° C. for 5 min onto a temperature controlled hot plate. The resulting film exhibited a very well oriented nematic mesophase at room temperature.

Comparative Example 2

A film is prepared as in Example 23, with the single difference that compound 16 is replaced by [4-[6-(4-prop-2-enoyloxybutoxycarbonyloxy)naphthalene-2-carbonyl]oxyphenyl]6-(4-prop-2-enoyloxybutoxycarbonyloxy)naphthalene-2-carboxylate from U.S. Pat. No. 7,670,505 B2 described U.S. Pat. No. 7,670,505 B2 (Paliocolor® LC1057). This film was dried at 100° C. for 5 min onto a temperature controlled hot plate. The resulting film exhibited a very well oriented nematic mesophase at room temperature.

Example 27

The retardation at 550 nm of the sample described in example 23, example 25, example 26, in comparative example 1 and in comparative example 2 are measured with an Ellipsometer. The thicknesses of the samples are measured by a contact stylus profilometer. The birefringence ($\Delta n$) was obtained from the determined retardation and thickness values according to the formula ($\Delta n$=Retardation/Thickness). The values are listed in Table 1.

TABLE 1

| Example | Thickness (μm) | Retardation at 550 nm | $\Delta n$ |
| --- | --- | --- | --- |
| 23 | 1.05 | 236 | 0.23 |
| 25 | 1.04 | 233 | 0.22 |
| 26 | 1.06 | 256 | 0.24 |
| 26B | 1.07 | 221 | 0.21 |
| 26C | 1.12 | 250 | 0.22 |
| 26D | 1.16 | 271 | 0.23 |
| 26E | 1.14 | 322 | 0.28 |
| Comparative example 2 | 1.03 | 206 | 0.20 |
| Comparative example 1 | 1.03 | 205 | 0.20 |

The films of Example 23, 25, 26, 26B, 26C, 26D and 26E have higher birefringence than the films of the comparative example 1 and 2. These new LCPs could be used for preparing phase retarder optical films as Quarter-Waveplate (QWP) and Half-Waveplate (HWP). A retarder transmits light and modifies its polarization state and is widely used in various display application or in security elements. The particularly high birefringence of these new LCPs leads to a significant thickness reduction of the retarder's films. As an example, Table 2 shows the required thickness to get a Half-Waveplate ($\lambda/2$) retarder (HWP) at 550 nm with the compounds 15, 16, 22, 22H, 22I, 22J, 22K used in respectively example 26, 23, 25, 26B, 26C, 26D and 26E.

TABLE 2

| Example | Required Thickness for HWP at 550 nm (μm) |
| --- | --- |
| 23 | 1.20 |
| 25 | 1.25 |
| 26 | 1.15 |
| 26B | 1.31 |

TABLE 2-continued

| Example | Required Thickness for HWP at 550 nm (μm) |
|---|---|
| 26C | 1.23 |
| 26D | 1.2 |
| 26E | 0.98 |
| Comparative example 2 | 1.38 |
| Comparative example 1 | 1.38 |

Example 28: Formation of Polarizing Film Comparative Example 3

A composition is obtained by mixing the following components:

29.26 part of compound of 10-[4-(4-cyanophenyl)phenoxy]decyl 2,5-bis[[4-(6-prop-2-enoyloxyhexoxy)benzoyl]oxy]benzoate described in the patent application WO2011/003846 A1 is mixed with 1.24 part of a black mixture of Dichroic Dyes® X13 manufactured by BASF, 0.95 part of Irgacure OXE03 manufactured by BASF and 0.016 part of 2,6-Di-tert-butyl-4-methylphenol. This mixture is dissolved in 68.5 part of cyclohexanone.

The solution is coated by K-bar coating with bar N°3 on a 100 nm photoalignment layer coated on a Glass (D263) substrate which has been subjected exposed to Linear polarized light of 250 mJ. Subsequently the substrate is heated in an oven at 90° C. for 5 min and cooled down to room temperature. The coated LCP layer is then photo-polymerised by irradiation with UV light using a Mercury lamp for approximately 2 min at room temperature under $N_2$ atmosphere to fix the orientation state of the liquid crystal.

Example 29: Formation of Polarizing Film with Comparative Example 4

A composition is obtained by mixing the following components:

29.33 part of [4-[6-(4-prop-2-enoyloxybutoxycarbonyloxy)naphthalene-2-carbonyl]oxyphenyl]6-(4-prop-2-enoyloxybutoxycarbonyloxy)naphthalene-2-carboxylate from U.S. Pat. No. 7,670,505 B2 described U.S. Pat. No. 7,670,505 B2 (Paliocolor® LC1057) is mixed with 1.18 part of a black mixture of Dichroic Dyes® X13 manufactured by BASF, 0.95 part of Irgacure OXE03 manufactured by BASF and 0.016 part of 2,6-Di-tert-butyl-4-methylphenol. This mixture is dissolved in 68.5 part of cyclohexanone.

The solution is coated by K-bar coating with bar N°3 on a 100 nm photoalignment layer coated on a Glass (D263) substrate which has been subjected exposed to Linear polarized light of 250 mJ. Subsequently the substrate is heated in an oven at 90° C. for 5 min and cooled down to room temperature. The coated LCP layer is then photo-polymerised by irradiation with UV light using a Mercury lamp for approximately 2 min at room temperature under $N_2$ atmosphere to fix the orientation state of the liquid crystal.

Example 30: Formation of Polarizing Film with Compound from Example 15

A composition is obtained by mixing the following components:

29.45 part of compound of example 15 is mixed with 1.06 part of a black mixture of Dichroic Dyes® X13 manufactured by BASF, 0.95 part of Irgacure OXE03 manufactured by BASF and 0.016 part of 2,6-Di-tert-butyl-4-methylphenol. This mixture is dissolved in 68.5 part of cyclohexanone.

The solution is coated by K-bar coating with bar N°3 on a 100 nm photoalignment layer coated on a Glass (D263) substrate which has been subjected exposed to Linear polarized light of 250 mJ. Subsequently the substrate is heated in an oven at 90° C. for 5 min and cooled down to room temperature. The coated LCP layer is then photo-polymerised by irradiation with UV light using a Mercury lamp for approximately 2 min at room temperature under $N_2$ atmosphere to fix the orientation state of the liquid crystal.

Example 31: Formation of Polarizing Film with Compound from Example 15

A composition was obtained by mixing the following components:

16.42 part of compound of example 15 is mixed with 1.00 part of a black mixture of Dichroic Dyes® X13 manufactured by BASF, 0.95 part of Irgacure OXE03 manufactured by BASF and 0.016 part of 2,6-Di-tert-butyl-4-methylphenol. This mixture is dissolved in 82 part of cyclohexanone.

The solution is coated by K-bar coating with bar N°3 on a 100 nm photoalignment layer coated on a Glass (D263) substrate which has been subjected exposed to Linear polarized light of 250 mJ. Subsequently the substrate is heated in an oven at 90° C. for 5 min and cooled down to room temperature. The coated LCP layer is then photo-polymerised by irradiation with UV light using a Mercury lamp for approximately 2 min at room temperature under $N_2$ atmosphere to fix the orientation state of the liquid crystal.

Example 32: Formation of Polarizing film with compound from example 22K

A composition is obtained by mixing the following components:

16.42 part of compound of example 22K is mixed with 1.00 part of a black mixture of Dichroic Dyes® X13 manufactured by BASF, 0.54 part of Irgacure OXE03 manufactured by BASF and 0.009 part of 2,6-Di-tert-butyl-4-methylphenol. This mixture is dissolved in 82 part of cyclohexanone.

The solution is coated by K-bar coating with bar N°3 on a 100 nm photoalignment layer coated on a Glass (D263) substrate which has been subjected exposed to Linear polarized light of 250 mJ. Subsequently the substrate is heated in an oven at 100° C. for 5 min and cooled down to room temperature. The coated LCP layer is then photo-polymerised by irradiation with UV light using a Mercury lamp for approximately 2 min at room temperature under $N_2$ atmosphere to fix the orientation state of the liquid crystal.

Example 33: Polarising Film Characteristics

The dichroic ratio (DR) in absorbance allow to define the polarization performance of a polarizing film. The DR is a material property and therefore it is independent on the thickness of the polarizer. The DR in absorbance can be determined through polarized spectroscopy and is defined as $$DR = Log(1/T_{perp})/(Log(1/T_{paral}))$$

Tperp is the transmittance of the light entering perpendicular to the transmissive axis of the polarisation film.

Tparal is the transmittance of the light entering parallel to the transmissive axis of the polarisation film. The transmittances Tperp and Tparal of example 28 to 32 are measured using an AxoScan polarimeter and they are used to determine the dichroic ratio (DR) at the wavelength 450 nm, 550 nm, 650 nm.

The thickness of the polarising film of example 28 to 32 is determined by Alpha-Step Stylus profiler.

The results of the thickness and the DR of the polarising film of example 28 to 32 are summarized in the Table 3.

TABLE 3

| Example | Compound | Thickness (µm) | Dichroic ratio | | |
|---|---|---|---|---|---|
| | | | 450 nm | 550 nm | 650 nm |
| 28 | Comparative example 3 | 5.0 | 7.2 | 9.0 | 10.2 |
| 29 | Comparative example 4 | 5.4 | 7.0 | 8.6 | 9.1 |
| 30 | Compound 15 | 5.2 | 8.2 | 10.9 | 12.6 |
| 31 | Compound 15 | 3.3 | 8.9 | 11.7 | 13.0 |
| 32 | Compound 22K | 3.6 | 10.3 | 13.6 | 14.8 |

It can be said that as the dichroic ratio is higher, the polarizing film is more efficient. A polarizing film with a high dichroic ratio can be obtained by using the composition of the present invention. Indeed, the polarising films made from the compound 15 and from the compound 22k of the present invention present Dichroic Ratio above 13 where as the DR of the polarising film of comparative example 3 and of comparative example 4 have a maximum DR of 10.2.

The invention claimed is:

1. A compound of formula (I)

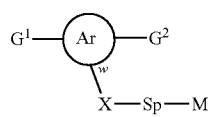

(I)

wherein $G^1$ and $G^2$ independently represent a polymerisable mesogenic substituent;

Ar represents an aromatic group selected from the group consisting of phenyl or naphthalenediyl;

w is 1 or 2;

X represents a group selected from the group consisting of —CH2—, —O—, —CO—, —COO—, —OOC—, —CONR'—, —OCOO— and —OCONR';

Sp represents a group of the formula —(CH2)p— in which p is an integer of 1 to 18 and in which one or two non-adjacent —CH$_2$— groups are optionally replaced by —CH=CH—; or in which one or two —CH$_2$— groups are optionally replaced by one or two groups selected from the group consisting of —O—, —CO—, —COO—, —OOC—, —CONR'—, —OCOO— and —OCONR' with the proviso that firstly the spacer group does not contain two adjacent heteroatoms and secondly when X is —CH$_2$—, p can also have a value of 0; and M represents an achiral group of formula (II)

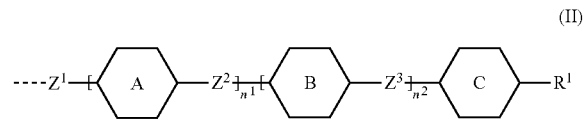

(II)

in which

A and B independently represent an optionally substituted six membered isocyclic or heterocyclic group or naphthalenediyl;

C is selected from the group consisting of an optionally substituted five and six membered isocyclic or heterocyclic group or naphthalenediyl;

$n^1$ and $n^2$ are 0 or 1 with the proviso that firstly $1 \leq n^1+n^2 \leq 2$ and secondly, when C is naphthalenediyl $0 \leq n^1+n^2 \leq 2$;

$Z^1$ is selected from the group consisting of —O—, —COO—, —OOC—, —CO—, —CONR'—, —NR'CO—, OCOO—, —OCONR'—, —NR'COO— and a single bond;

in which

R' is selected from the group consisting of hydrogen, a lower achiral alkyl group and a lower achiral alkenyl group;

$Z^2$ and $Z^3$ are independently selected from the group consisting of single bond, —COO—, —OOC—, —CH$_2$—CH$_2$—, —CH$_2$O—, —OCH$_2$—, —CH=CH—, —C≡C—, —(CH$_2$)$_4$— and —(CH$_2$)$_3$O—; and $R^1$ is selected from the group consisting of —CN, —COR, —COOR, —OCOR, —CONR'R, —NR'COR, OCOOR, —OCONR'R, —NR'COOR, —F, —Cl, —CF$_3$, —OCF$_3$, —OR and —R in which R is selected from the group consisting of hydrogen, an achiral C$_{1-18}$ alkyl group and an achiral C$_{4-18}$ alkenyl group with the double bond at 3-position or higher; and R' is as defined above;

wherein the polymerisable mesogenic substituents $G^1$ and $G^2$ are each independently represented by the group of formula III

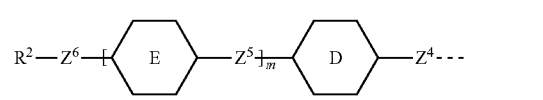

(III)

wherein

D is selected from the group consisting of 1,4-naphthalenediyl, 2,6-naphthalenediyl and 1,5-naphthalenediyl E is selected from the group consisting of optionally substituted 1,4-phenylene, pyridine-2,5-diyl, pyrimidine-2,5-diyl, trans- 1,4-cyclohexylene, trans- 1,4-cyclohexane, trans-1,3-dioxane-2,5-diyl, 1,4-naphthalenediyl, 2,6-naphthalenediyl and 1,5-naphthalenediyl;

m is 1 or 0, $Z^4$ and $Z^5$ are independently selected from the group consisting of a single bond, —COO—, —OOC—, —OCOO—, —CH$_2$—CH$_2$—, —CH$_2$O—, —OCH$_2$—, —CH═CH—, —C≡C—, —(CH$_2$)$_4$— and —(CH$_2$)$_3$O—;

$Z^6$ represents a group of formula —(CH$_2$)$_q$X— in which q is an integer having a value of 1 to 18 and X is as defined above, and in which one or two non-adjacent —CH$_2$— groups may be optionally replaced by —CH═CH— or in which one or two —CH$_2$— groups may be replaced by one or two additional linking groups X with the proviso that firstly the group $Z^6$ does not contain two adjacent heteroatoms and secondly when X is —CH$_2$, q can also have a value of 0; and $R^2$ represents a polymerisable group selected from the group consisting of CH$_2$═C(Ph)-,
CH$_2$═CW—COO—, CH$_2$═CH—COO-Ph-,
CH$_2$═CW—CO—NH—, CH$_2$═CH—O—,
CH$_2$═CH—OOC—,
Ph-CH═CH—, CH$_2$═CH-Ph-, CH$_2$═CH-Ph-O—,
R$_3$-Ph-CH═CH—COO—,
$R^3$—OOC—CH═CH-Ph-O— and 2-W-epoxyethyl, in which W represents H, Cl, Ph or a lower alkyl, and $R^3$ represents a lower alkyl with the proviso that when $R^3$ is attached to a phenylene group (-Ph-) it may also represent hydrogen or a lower alkoxy.

2. A compound according to claim 1, in which X is selected from —CH$_2$—, —O—, —COO—, —OOC— and —OCOO—.

3. A compound according to claim 1, in which the integer p of the group Sp has a value of from 1 to 12.

4. A compound according to claim 1, in which the group $Z^1$ is selected from the group consisting of —O—, —COO—, —OOC—, —OCOO— and a single bond.

5. A compound according to claim 1, in which the groups $Z^2$ and $Z^3$ are selected from the group consisting
of —COO—, —OOC—, —CH$_2$CH$_2$—, —CH$_2$O—, —OCH$_2$—, —CH═CH—, —C≡C— and a single bond.

6. A compound according to claim 1, in which the group $R^1$ s selected from the group consisting of —CN, —COOR, —OCOR, F, Cl, CF$_3$, OCF$_3$, OR, R, in which R represents a C$_{1-12}$ achiral alkyl, or C$_{4-12}$ achiral alkenyl group, with the double bond at position 3- or higher, or hydrogen.

7. A compound according to claim 1, in which the group $R^2$ is selected from the group consisting of CH$_2$═CW—COO— and CH$_2$═CH—O—.

8. A LCP mixture comprising the compound of formula (I) according to claim 1.

9. A LCP network comprising a compound according to claim 1 in cross-linked or polymerised form.

10. A method of using a compound according to claim 1, comprising manufacturing an optical or an electro-optical device with the compound according to claim 1.

11. An optical or electro-optical device including a compound according to claim 1.

12. A compound according to claim 2, in which the integer p of the group Sp has a value of from 1 to 12.

\* \* \* \* \*